Figure 8:
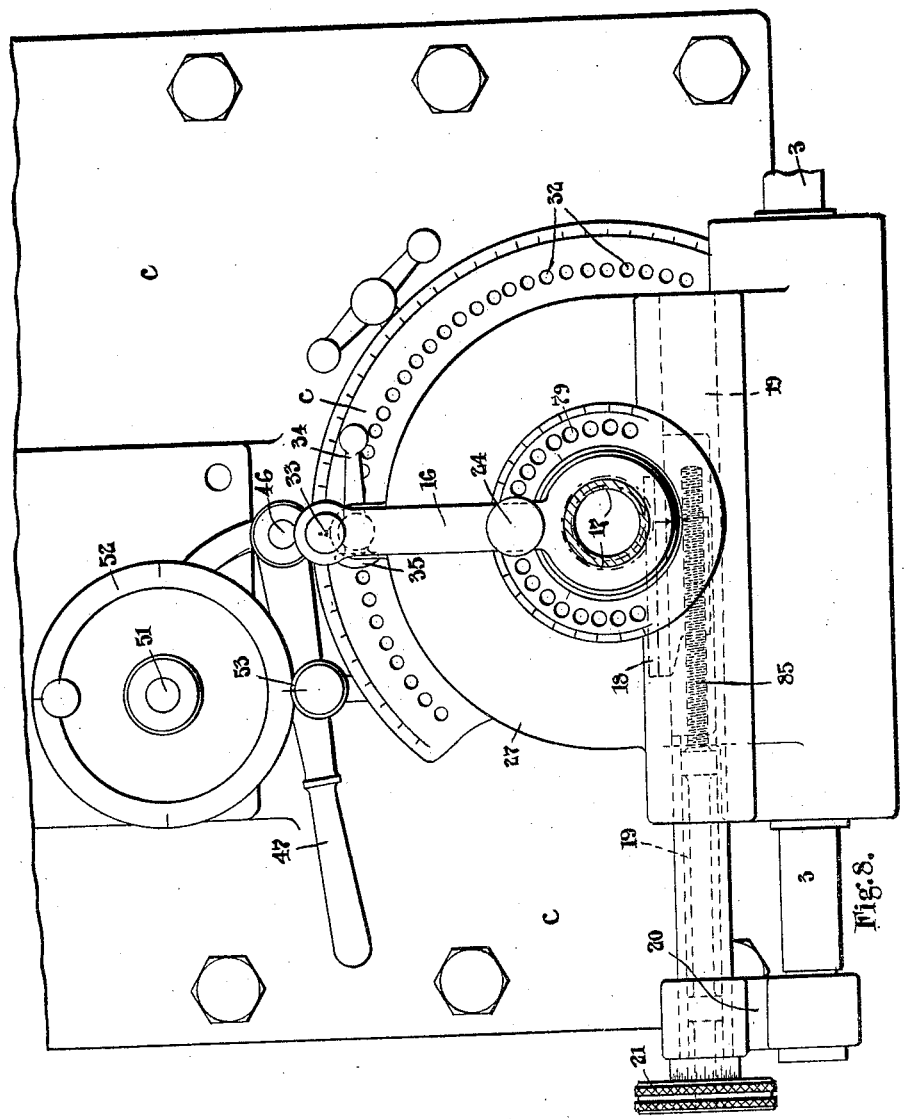
Figure 9:
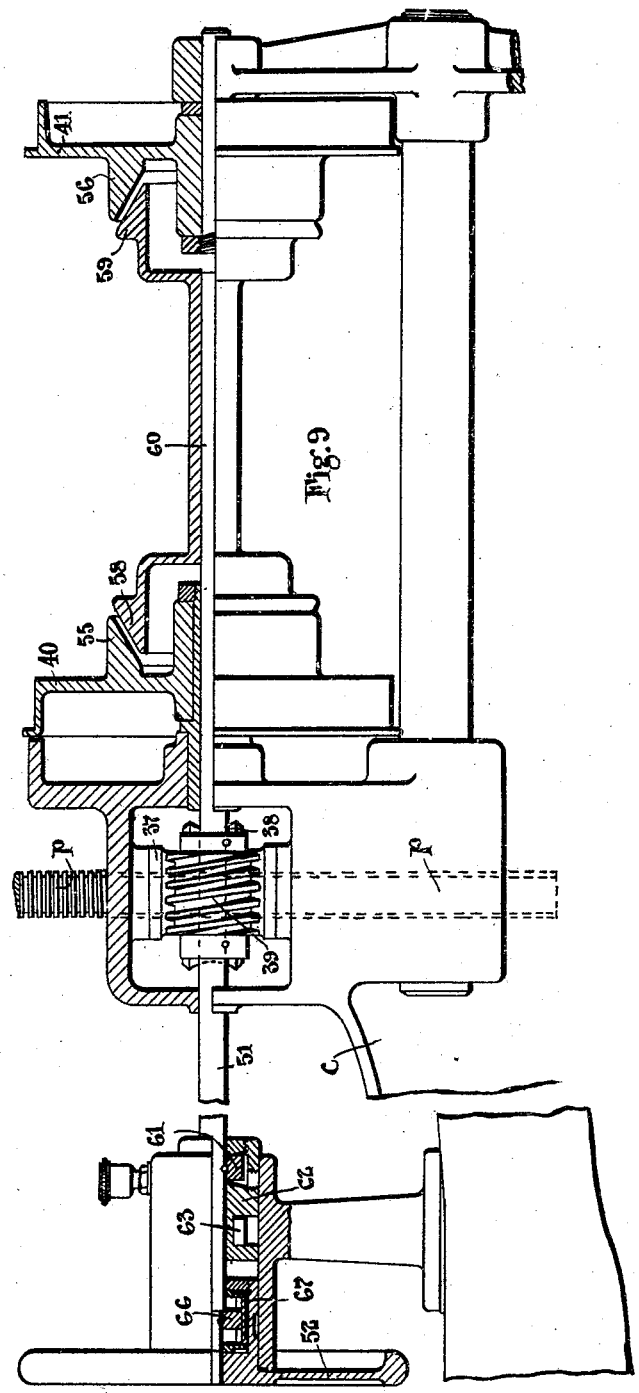
Figure 10:
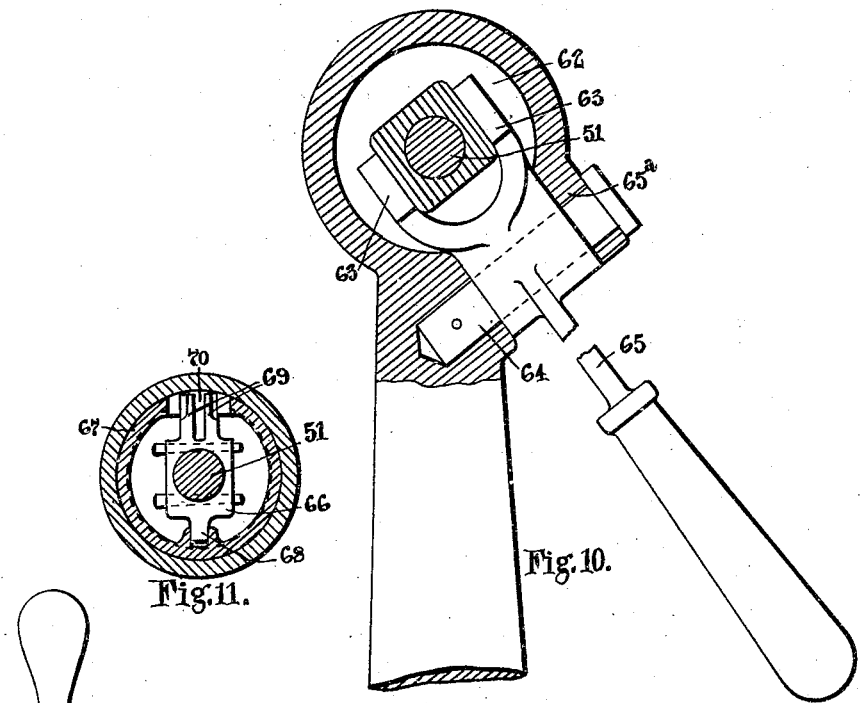
Figure 11:
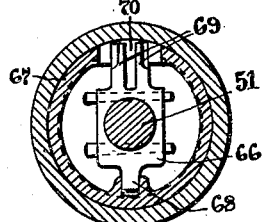

J. W. WADKIN & T. SCOTT-KING.
WOODWORKING MACHINE.
APPLICATION FILED AUG. 22, 1908.
934,484.
Patented Sept. 21, 1909.
12 SHEETS—SHEET 1.
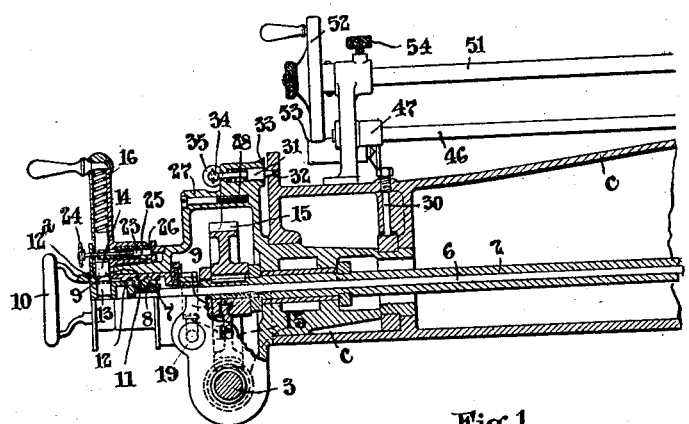
Fig.1.
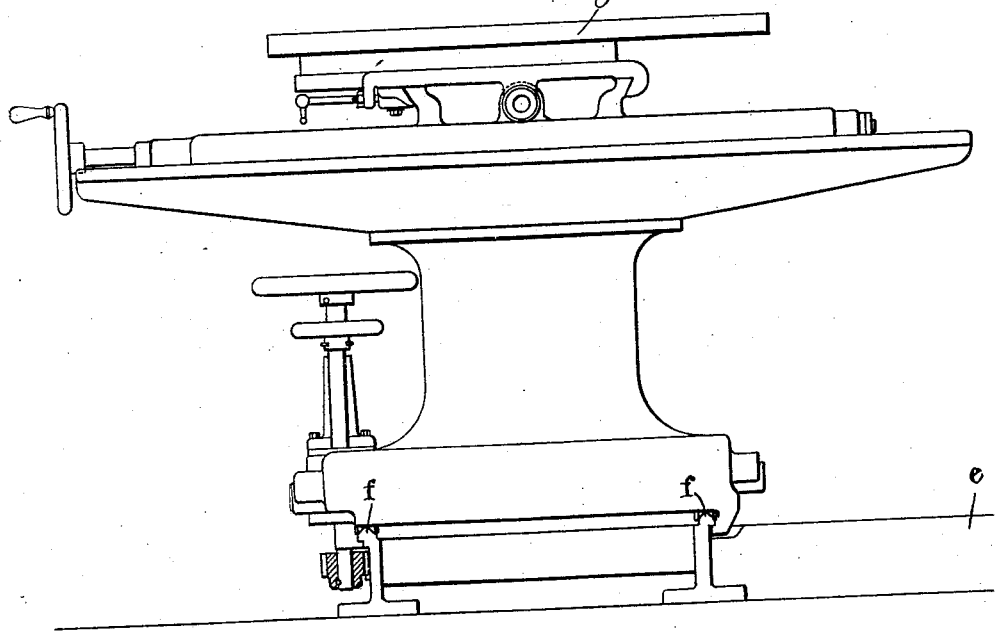
Witnesses:
Inventors
Joseph William Wadkin
Thomas Scott-King
by their Attorney

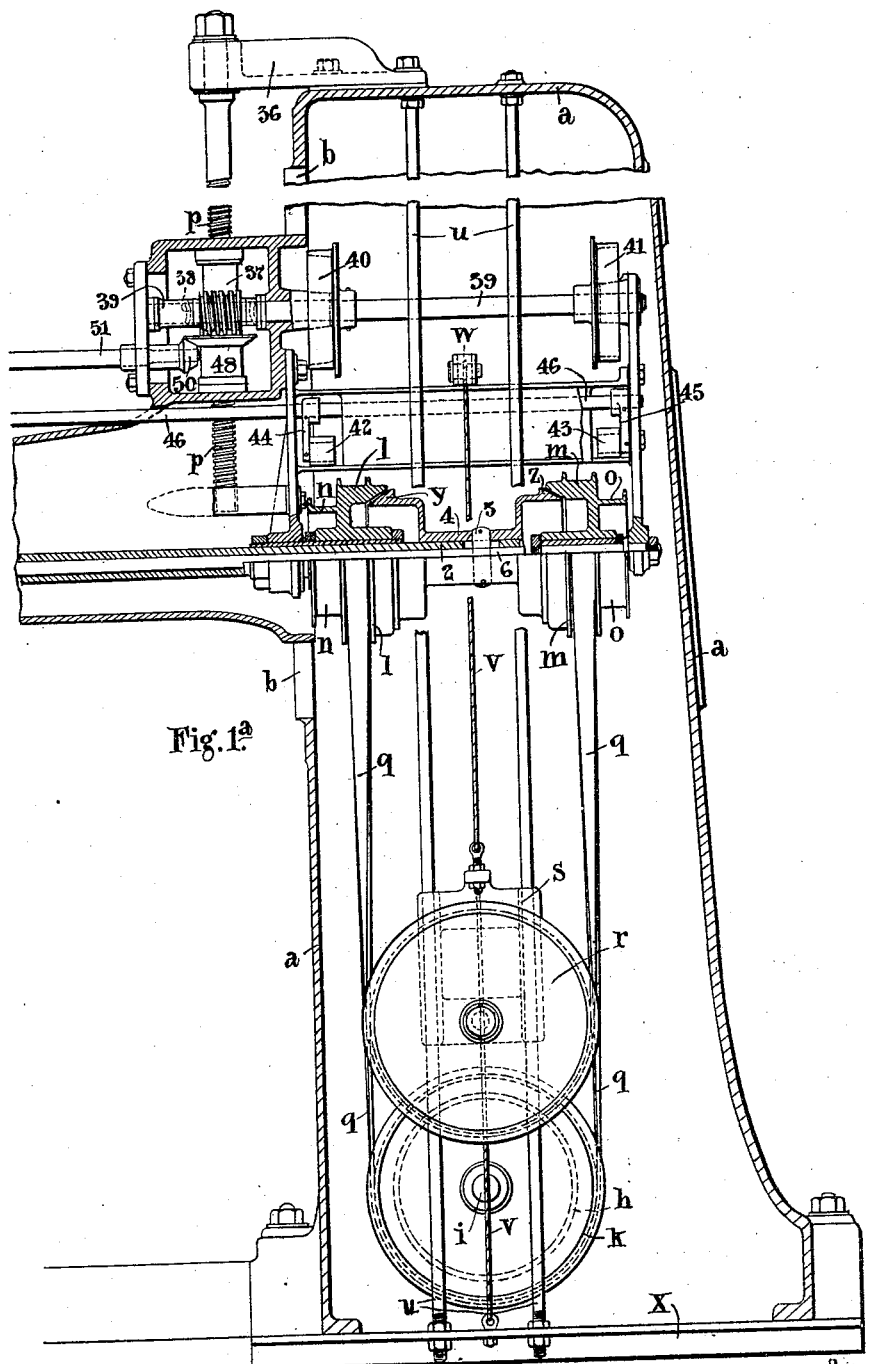

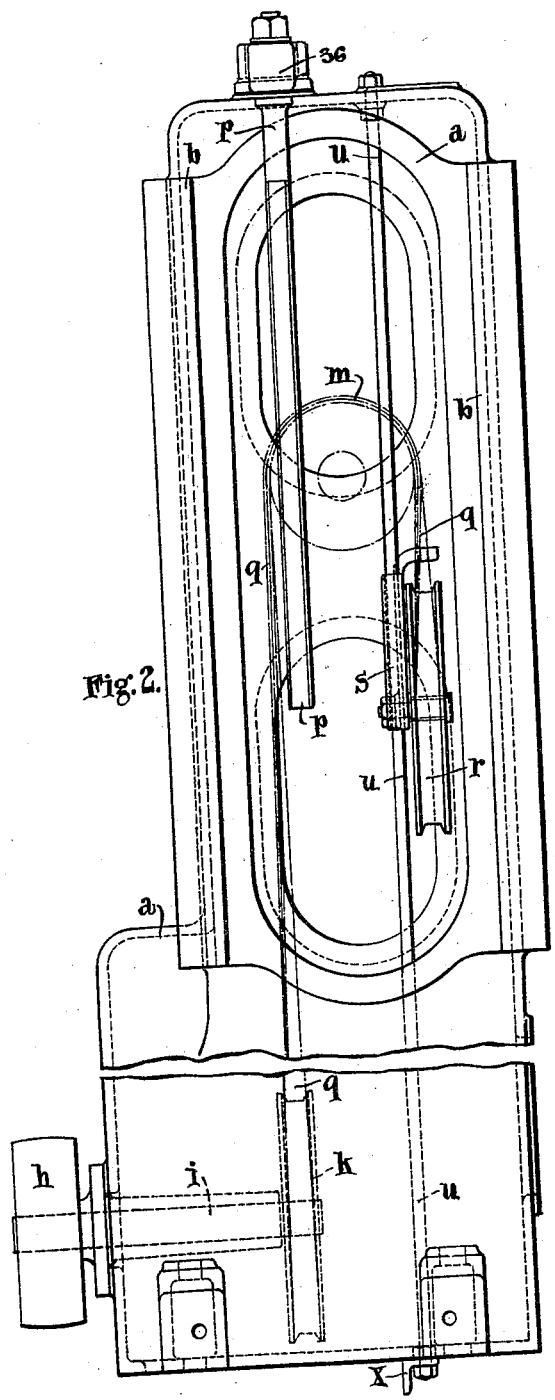

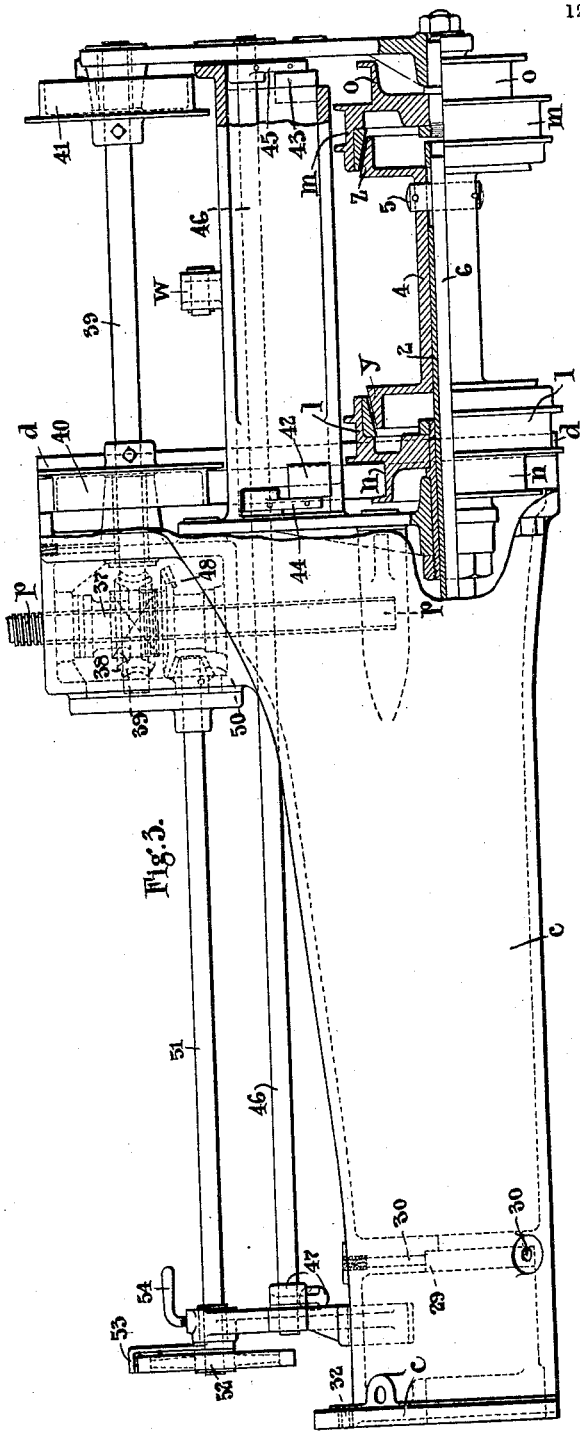

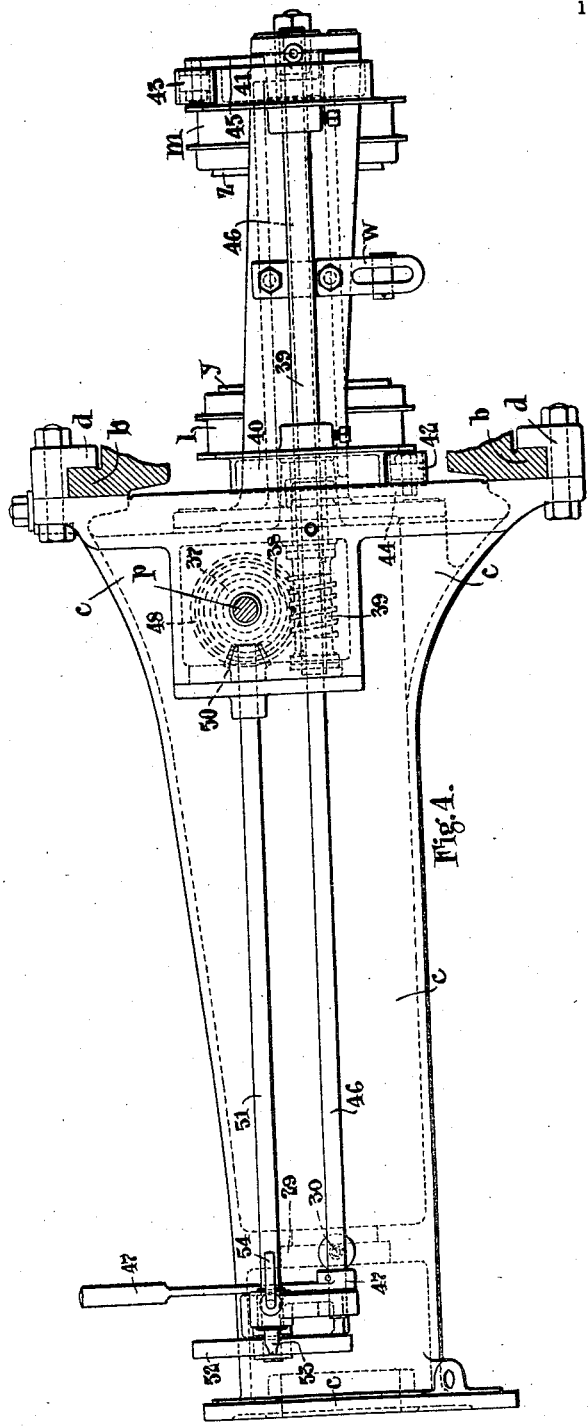

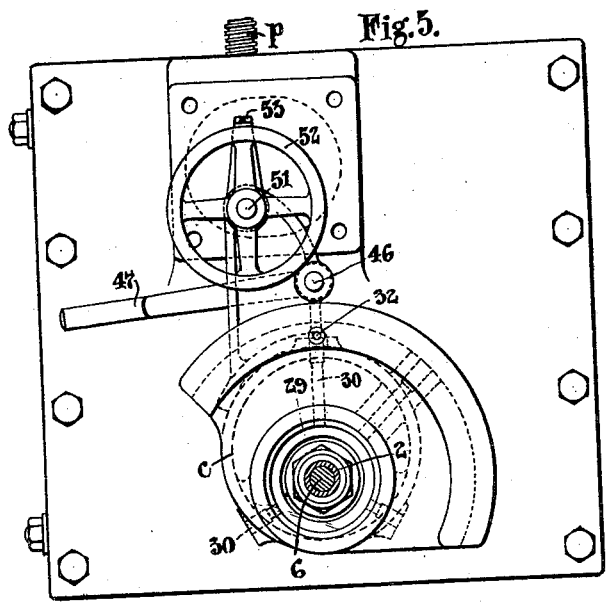
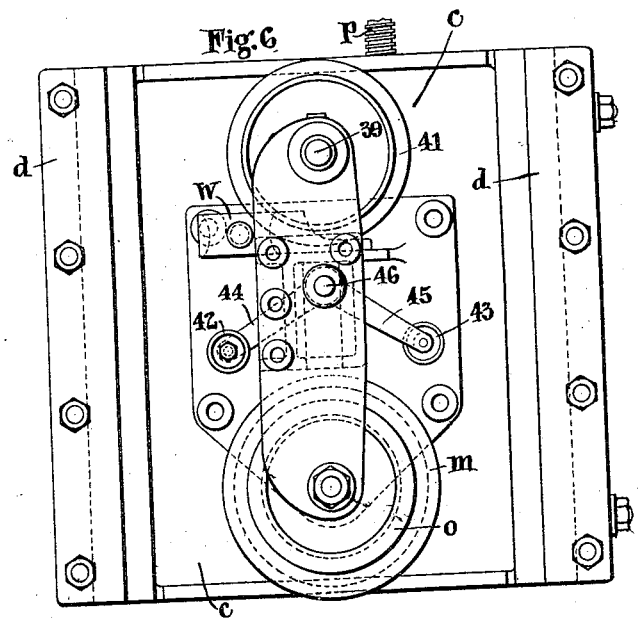

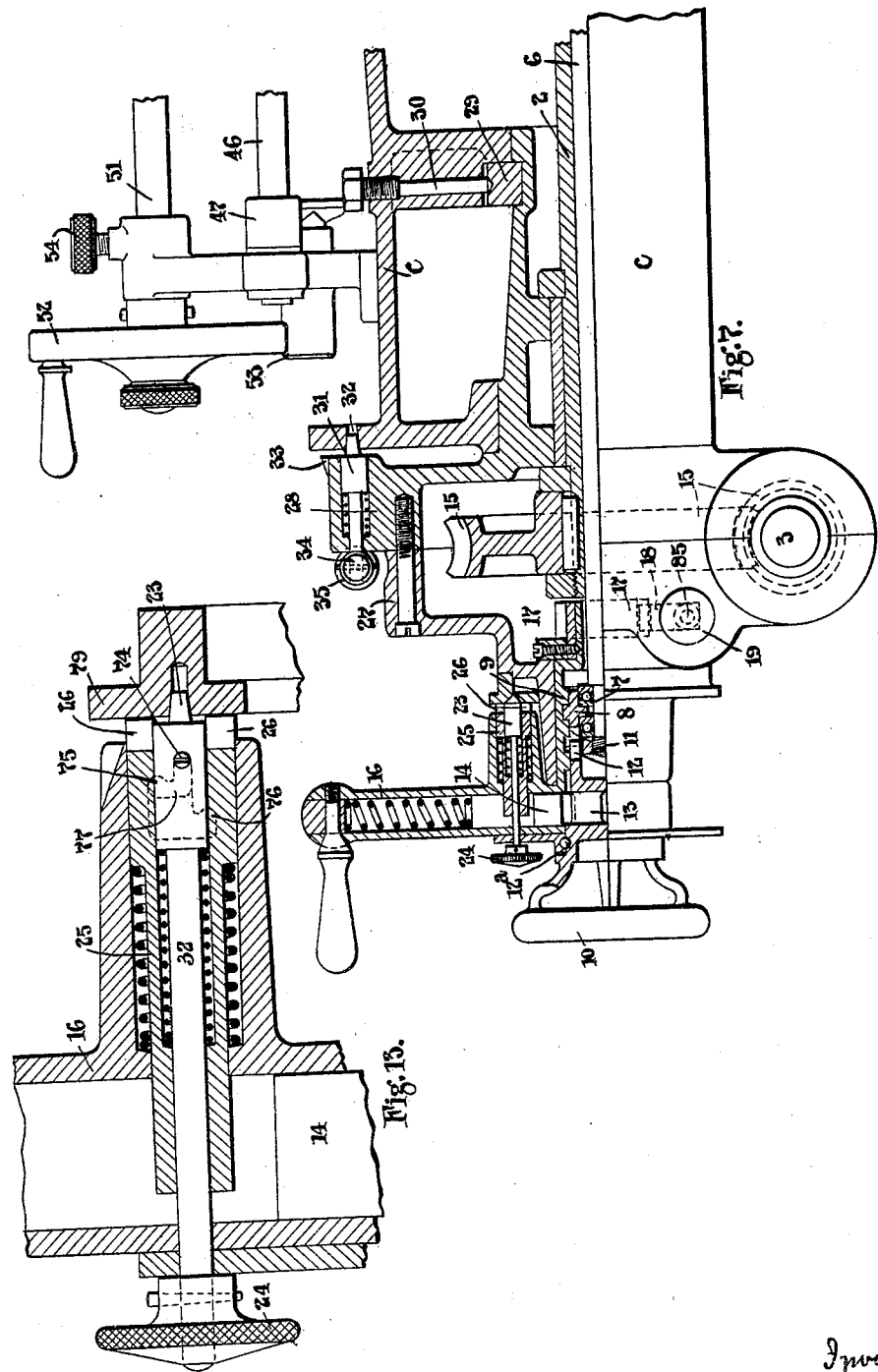

J. W. WADKIN & T. SCOTT-KING.
WOODWORKING MACHINE.
APPLICATION FILED AUG. 22, 1908.

934,484.

Patented Sept. 21, 1909.
12 SHEETS—SHEET 8.

Witnesses:—

Inventors
Joseph William Wadkin
Thomas Scott-King
by their Attorney

J. W. WADKIN & T. SCOTT-KING.
WOODWORKING MACHINE.
APPLICATION FILED AUG. 22, 1908.

934,484.

Patented Sept. 21, 1909.
12 SHEETS—SHEET 9.

Witnesses:—
C. Carissa Franck.
Julia E. Crone.

Inventors
Joseph William Wadkin
Thomas Scott-King
by their Attorney

J. W. WADKIN & T. SCOTT-KING.
WOODWORKING MACHINE.
APPLICATION FILED AUG. 22, 1908.

934,484.

Patented Sept. 21, 1909.
12 SHEETS—SHEET 10.

Witnesses:—
Clarissa Franck
Julia E. Crane

Inventors
Joseph William Wadkin
Thomas Scott-King
by Attorney
their Attorney

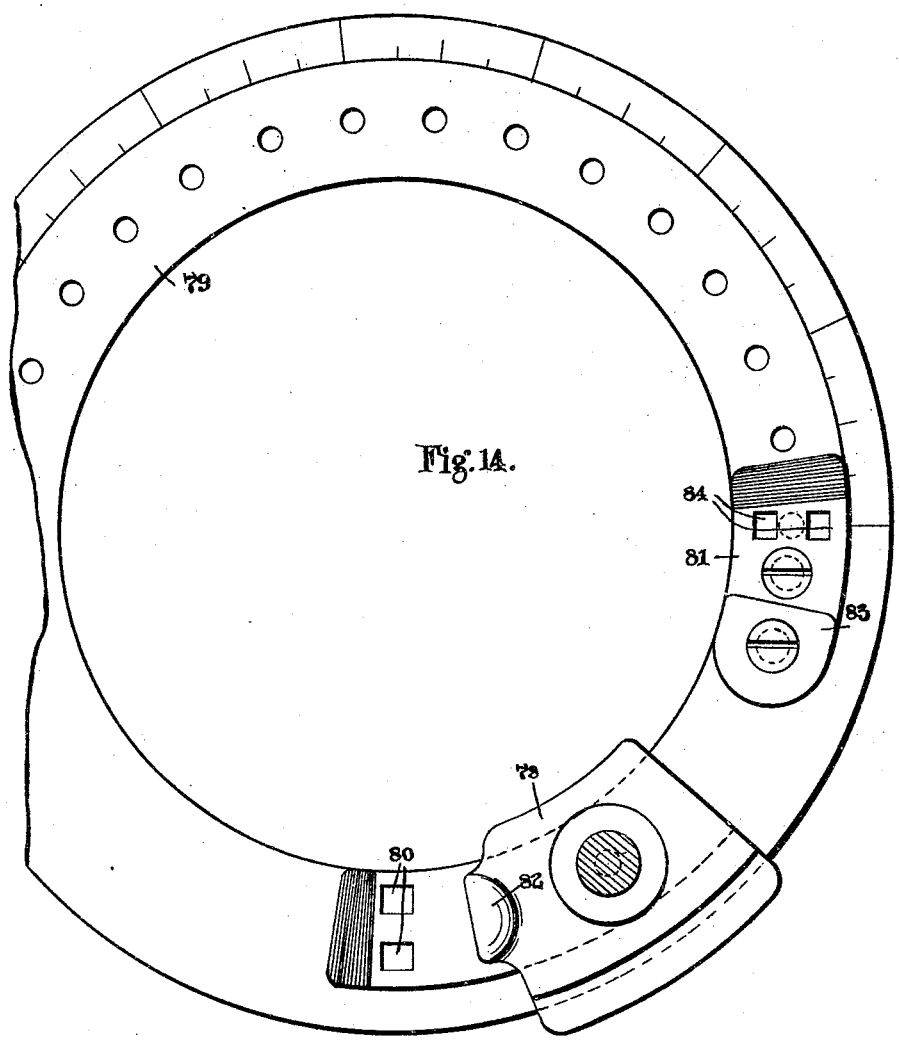
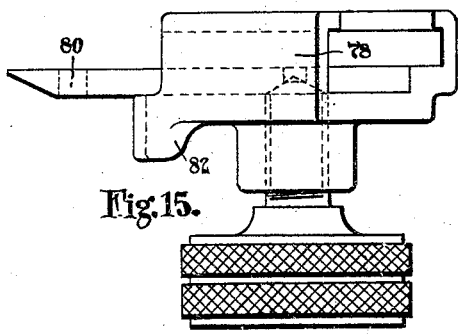

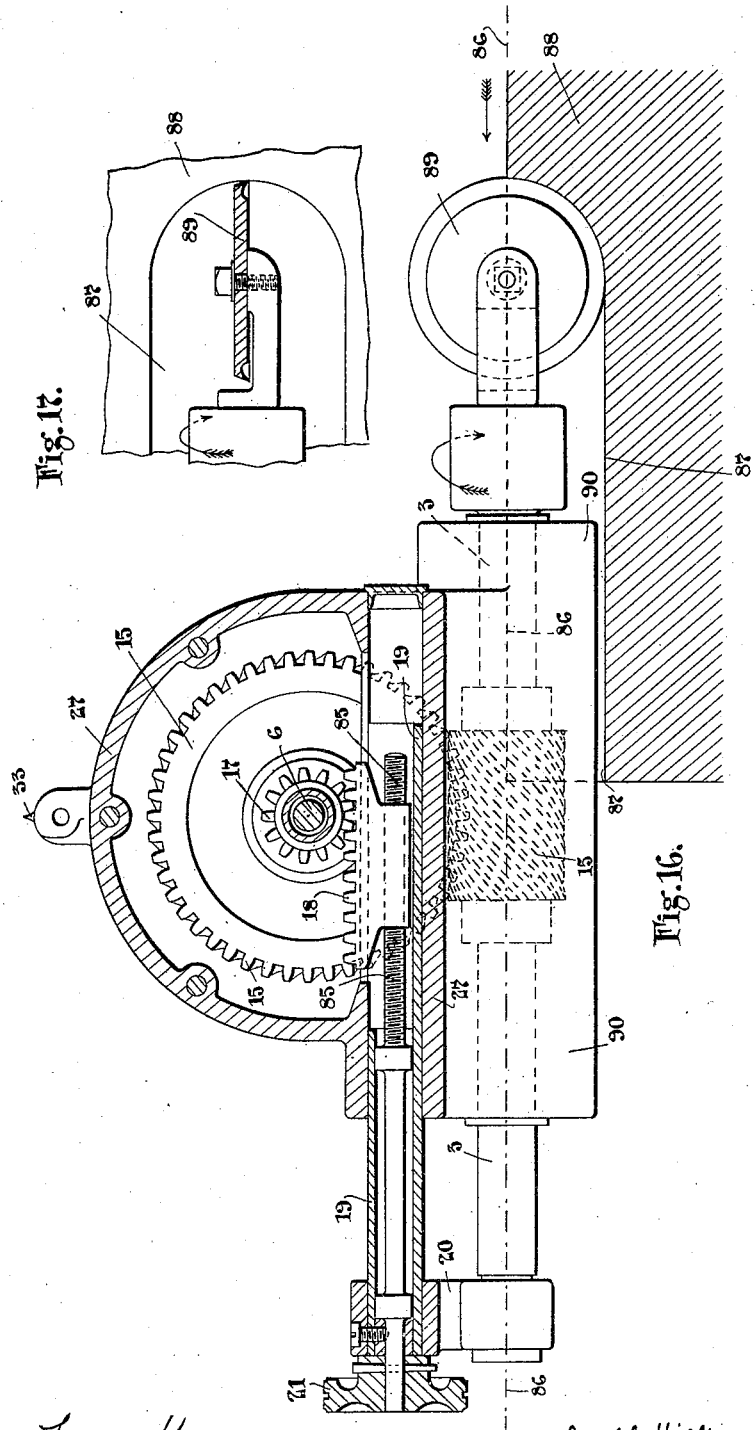

UNITED STATES PATENT OFFICE.

JOSEPH WILLIAM WADKIN, OF PRESTON, AND THOMAS SCOTT-KING, OF PENARTH, ENGLAND.

WOODWORKING-MACHINE.

934,484.  Specification of Letters Patent.  Patented Sept. 21, 1909.

Application filed August 22, 1908. Serial No. 449,874.

*To all whom it may concern:*

Be it known that we, JOSEPH WILLIAM WADKIN, a subject of the King of Great Britain and Ireland, and residing at 18 Bairstow street, Preston, in the county of Lancaster, England, and THOMAS SCOTT-KING, a subject of the King of Great Britain and Ireland, and residing at 43 Westbourne road, Penarth, in the county of Glamorgan, Wales, England, have invented certain new and useful Improvements in Woodworking Machinery, of which the following is a specification.

This invention relates to wood working machinery the object being to concentrate in a single machine, the working functions of all, or nearly all, other wood-working machines usually employed to produce irregular forms of more than one geometric function, that is to say to provide a machine which will stand relatively to all other single function wood working machines as the Universal milling machine stands to all other metal working machines excepting those producing turned or planed work.

The machine is especially arranged for the production of intricate core and pattern work, recessing in joinery, profiling, instrument and ammunition trays and cases, ornamentation geometric cabinet work, carriage and motor body work and the like in which irregular forms occur that have hitherto been produced by hand, or by hand guided material operated under separate machines.

In core boxes and like work it is often necessary to form semi-cylindrical recesses of considerable length and curvature such as for instance, straight and bent pipes, passages in valves and like work, and in order to accurately produce these shapes it is necessary that the center of the cutter spindle and housing shall be in the same plane as the upper surface of the work operated upon. In producing irregular surfaces it is necessary to frequently reverse the direction of the cutter in order to cut with the grain, and it is desirable to have the operating mechanism placed in as close juxtaposition to the cutter spindle as possible so as to reduce the inertia and momentum of the parts started and stopped to a minimum.

According to the present invention the cutter spindle is mounted at one end on an overhanging arm supported on an upright standard, column or a convenient fixture attached to the wall or column of the building, the work operated upon being placed upon a table adapted to run on a runway or rails, and provided with various adjustments for raising and lowering the cutter spindle and moving the work table into various positions. In order to place the control within easy reach of the operator the main driving pulley or electric motor is situated at or near the base of the standard to permit of ready control. The main pulley drives the cutter spindle through mechanism hereinafter described and also transmits the necessary power for raising and lowering the overhanging arm. The latter, however, is also adapted to be raised or lowered by hand and the hand feed and the power feed are so arranged that either can be employed independently.

The mounting and driving of the cutter spindle form an important feature of the invention. It is driven from a horizontal shaft passing through the overhanging arm by means of worm or other gearing which permits of the spindle being mounted in such relation to the arm that the center of the spindle may be at or below the level of the work operated upon, and the horizontal shaft is driven from the main pulley shaft hereinbefore referred to by a belt drive and reversing gear which can be controlled from the capstan head close to the cutter spindle, and which belt drive automatically adapts itself to the rising or falling motion of the overhanging arm. Similarly the rising and falling motion of the overhanging arm when effected by hand or when effected by power is also controlled from the capstan head.

In the accompanying drawings, Figures 1 and 1ª together form a side elevation partly in section of a machine according to the invention. Fig. 2 is a front elevation of the vertical standard. Figs. 3 and 4 are respectively a side elevation and plan of the overhanging arm illustrating the mechanism for raising and lowering the latter. Figs. 5 and 6 are front and rear elevations respectively corresponding to Fig. 3. Figs. 7 and 8 are detail views of the capstan head shown in Fig. 1. Figs. 9 to 12 are detail views illustrating a modification in the controlling mechanism for effecting the rising and falling of the overhanging arm. Fig. 13 is a detail section of catches. Fig. 14 is a detail view of a dial plate and catch plate or stops thereon. Fig. 15 is a detail plan of one of the catch plates. Fig. 16 is a sectional elevation showing the cutter spindle with its housing and gearing, and also showing the cutter, the cutter spindle and housing entering the semi-cylindrical groove in a piece of work. Fig. 17 is a section of the cutter.

In carrying out the invention according to one mode a vertical standard, $a$, is provided with flanged slides, $b$, on the vertical face to receive an overhanging arm, $c$, having planed bearing strips, $d$, to correspond. The base of the standard, $a$, is also formed with projecting facings on the front for the attachment of run-way cross girders, $e$, for supporting the run-way, $f$, upon which the work table, $g$, is adapted to run. A main driving pulley, $h$, is mounted on a main driving shaft, $i$, near the base of the standard, $a$. The shaft, $i$, may of course be driven by an electric motor either directly or through gearing. On the shaft, $i$, is a second pulley, $k$. A set of pulleys is carried by a rising and falling arm, these pulleys, however, being so mounted within a framework or bracket extending from the arm that they are situated within the vertical standard. The set comprises two pulleys, $l$, $m$, which are driven from the pulley, $k$, and two other pulleys, $n$ $o$, which drive the feed motion shaft, 39, for giving the up and down motion to the overhanging arm, $c$. The pulleys, $l$ $m$, are driven by a single belt, $q$, from the pulley, $k$, the two sides of the belt as they rise from the latter being respectively passed over the two pulleys, $l$ $m$, and being tensioned by a pulley, $r$, arranged in the loop of the belt, $q$, and carried upon a sliding frame, $s$, attached to a suitable counterweight. By this means the belt is always maintained in proper tension whatever may be the position of the overhanging arm. The tension or balance pulley, $r$, is carried by the frame, $s$, sliding vertically on two rods, $u$, supported at the top of the standard and at the cross girder, $x$, at the bottom thereof. A check wire, $v$, supports the frame, $s$, and balance pulley, $r$, in the event of the belt, $q$, breaking, the check wire, $v$, being looped through a bracket, $w$, and attached to the cross girder, $x$, at the base of the standard. The two pulleys, $l$ $m$, driven by the looped belt, $q$, are arranged to run loose. They are fitted internally with clutch surfaces into which conical clutch members, $y$ $z$, can be thrust so as to clutch either of the pulleys, $l$ $m$, to a horizontal shaft, 2, running through the overhanging arm, $c$, which shaft is adapted to drive the cutter spindle as hereinafter described. As the two, pulleys, $l$ $m$, are driven by the opposite sides of the same belt, $q$, they run in opposite directions so that by clutching one or the other pulley to the horizontal shaft, 2, a forward or reverse drive is imparted to the cutter spindle, 3.

The conical clutch members, $y$ $z$, above referred to are integral with or secured to a sleeve, 4, which is capable of being moved longitudinally on the horizontal shaft, 2, but is adapted to rotate the latter by means of a cotter, 5. The horizontal shaft, 2, is hollow and a controlling rod, 6, is passed right through it. This rod, 6, is connected to the cotter, 5, at one end while the other end which is situated at the capstan head near the cutter spindle, 3, is fitted with collars, 7, which are adapted to be engaged by a threaded piece, 8, engaging in a screw threaded boss, 9, and arranged to be rotated by a hand wheel, 10, on the face of the capstan head so as to impart a longitudinal movement to the controlling rod, 6, for the purpose of putting one or other clutch, $y$ $z$, into gear or for disengaging both of them as the case may be. The threaded piece, 8, has clutch jaws, 11, which are engaged by similar jaws, 12, on the hand wheel, 10, the latter rotating within the threaded boss, 9, but being prevented from moving in an endwise direction by means of a pin, $12^a$, engaging in a groove in said wheel. The hand wheel, 10, is provided with an eccentric pin, 13, adapted to be engaged by a spring pressed plunger, 14, so that the wheel, 10, is maintained or locked in either the backward or forward position so as to hold the respective clutch in gear. The end of the plunger, 14, has a projecting ridge to engage in a slot in the eccentric pin when the hand lever is in the "stop" or neutral position. In order to reduce friction at the collars, 7, on the end of the controlling rod, 6, the threaded piece, 8, rests within race ways or ball bearings.

The outer spindle, 3, is preferably driven from the horizontal shaft, 2, through worm gear, 15, the worm being multiple threaded and the teeth of both the worm and wheel being inclined at the maximum angle $i.$ $e.$ $45°$; although any other suitable form of drive may be employed as long as the center of the cutter spindle is well below the capstan head in order to allow the center of the cutter to be brought down to or below the level of the surface of the work operated upon. That is, the cutter spindle 3 should be so mounted that it and its housing 90 are situated below the overhanging arm $c$ and sufficiently clear of the latter that when semi-cylindrical grooves are to be cut, as indicated for example in Fig. 16, the spindle 3 and housing 90 can be arranged with their axis 86 in alinement with or actually coincident with the axis of the semi-cylindrical groove, thus enabling a true semi-cylindrical groove to be cut. In Fig. 16 a true semi-cylindrical groove 87 is supposed to be cut in the piece of work 88 and not only is the axis 86 of the cutter spindle 3 in alinement with the axis of the groove 87 but the spindle 3 and housing 90 are shown actually entering the groove 87. When cutting semi-cylindrical grooves a circular cutter 89 is preferably used, the cutter also preferably being adapted to cut when the spindle 3 is revolved in either direction. The cutter spindle, 3, is adapted to be moved endwise by means of a hand lever, 16, mounted upon the screw threaded boss, 9, within which the clutch control devices are mounted as hereinbefore referred to. On a prolongation of this threaded boss, 9, a feed pinion, 17, is keyed. The pinion, 17, engages in a rack, 18, carried within a hollow sliding rod, 19, attached by a cross head, 20, to one end of the cutter spindle, 3, the cross head, 20, being fitted with ball bearings so as to reduce the friction at this point. In order to provide for a fine adjustment or a micrometer feed of great exactness such as is required when finishing patterns or for like purposes the rack, 18, is mounted upon a threaded spindle, 85, arranged within the sliding rod and fitted with an external hand wheel, 21, as shown in Fig. 8, by which the fine adjustment can be made.

The hand lever, 16, before mentioned preferably contains the spring pressed plunger, 14, which maintains the clutch controlling hand wheel, 10, in its set position and this hand lever, 16, may be locked in any required position by a small spring pressed plunger, 23, adapted to engage in any one of a series of holes in a disk or dial plate, 79, on the face of the capstan head, and the plunger, 23, may be provided with a small lever on its end by which it may be held in its withdrawn position when required against the action of its spring, but it is preferred, however, to arrange this spring pressed plunger or pin, 23, to be withdrawn direct by a knob or milled head, 24, the pin, 23, being held in its withdrawn position by giving it a partial turn for instance in an anti-clockwise direction so that a pin, 74, (Fig. 13) carried by it engages with a recess, 75, and is held out of action. This arrangement provides a coarse but fixed amount of feed for lateral cutting. A second spring pressed catch in the form of a sleeve, 25, surrounds the aforesaid plunger or pin, 23, the sleeve, 25, having two square pins, 26, projecting from its end. This catch is adapted to be withdrawn when the aforesaid plunger, 23, is withdrawn still farther back and given a partial turn in a clockwise direction, the pin, 74, engaging with another recess, 76, which retains both catch plungers or pins out of action. A slot, 77, in the sleeve permits of the plunger, 23, being withdrawn without the sleeve, 25. The function of the second catch is to automatically engage and hold the before mentioned hand lever, 16, in the zero position and in a movable catch plate, 78. The latter is adapted to slide around the dial plate, 79, and to be clamped in any position. It is formed with two square holes, 80, to receive the square pins, 26, on the catch. A similar catch plate, 81, is screwed or fixed in the zero position. The catch plates, 78 and 81, have stops, 82, 83, respectively just beyond the square holes, 80, 84, up to which the lever, 16, may be moved when the catches are withdrawn. The hand lever is preferably arranged to move through half a circle.

The capstan head containing the helical or spiral gear and other parts referred to is preferably made in two parts, 27, 28, split on the center of the worm wheel, 15, and cutter spindle, 3, and in the same plane. The head revolves in the fore portion of the overhanging arm, c, and is held in place endwise by a halved ring, 29, and three binding screws, 30. The outer part of the capstan head is bored to receive the threaded boss, 9, which operates the threaded piece, 8, working between the ball bearings on the end of the clutch controlling rod, 6. The capstan head may be held or locked in various positions by means of a spring pressed plunger, 31, adapted to engage in any one of a series of holes, 32, on the adjacent portion of the overhanging arm, c, a suitable scale or gage being marked thereon and a pointer, 33, being provided on the capstan head. The spring pressed plunger may be held in the withdrawn position by a small lever, 34, pivoted on its end, the lever being provided with a knob or enlargement, 35, adapted to be moved into a cavity on the head so that the plunger is held in the withdrawn position against the action of its spring.

The cutter spindle, 3, is mounted in ball bearings suitably arranged within a housing carried by the capstan head.

The up and down feed motion of the overhanging arm, c, is effected by means of a vertical feed screw, p, which is carried by an overhanging bracket, 36, at the top of the vertical standard, a. When the power feed is used the vertical feed screw, p, is stationary and the overhanging arm, c, is fitted with a nut, 37, attached to or integral with a worm wheel, 38, which is rotated in one direction or the other, so as to cause the overhanging arm, c, to rise or fall, by means of a worm shaft, 39, fitted with two pulleys, 40, 41, driven by belts from pulleys, n o, integral with or attached to the clutch pulleys, l m, hereinbefore referred to. As these clutch pulleys, l m, are constantly rotated the belts connecting the pulleys 40, 41, to the feed pulleys, n o, are normally loose but they are adapted to be tensioned as required by means of tension pulleys, 42, 43, carried by rocking levers, 44, 45, which are mounted on a rock shaft, 46, extending to the end of the overhanging arm, c, adjacent to the capstan head where it is provided with a handle, 47, by which the operator can tension either belt as desired or let both of them run free accordingly as he desires the overhanging arm, c, to rise, fall or remain stationary. The overhanging arm, c, is also provided with hand feed gear which consists of a bevel wheel, 48, fitting on the top of the threads of the feed screw, p, and having a sliding key, the arrangement being such that when the bevel wheel, 48, is revolved the feed screw, p, is rotated in the worm wheel, 38. The bevel wheel, 48, is adapted to be revolved by means of a pinion, 50, fitted on the end of a shaft, 51, extending to the end of the overhanging arm, c, adjacent to the capstan head where it is fitted with a hand wheel, 52. An index pointer, 53, is provided for this hand wheel, 52. The pointer being stationary as shown in Figs. 1 and 7 or adapted to be adjusted to the zero position of the wheel and locked in place by means of a locking lever, 54, Fig. 3, so that the small degrees of feed required can be accurately effected by means of this hand wheel, 52. From the above it will be understood that when the power feed is used the hand feed locks or holds the feed screw, whereas when the hand feed is operated the power feed locks the worm wheel or nut for the screw which is rotated by the hand feed mechanism. Means may be provided for enabling the feed to automatically stop when arriving at the top or bottom positions.

Figure 12:
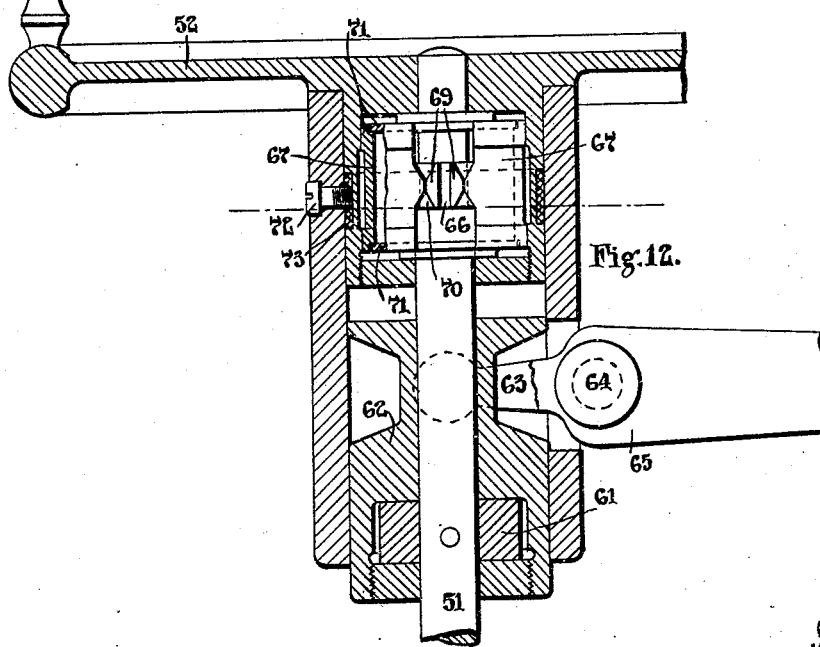

An alternative arrangement for the hand and power motion for raising and lowering the arm, c, is illustrated in Figs. 9 to 12. In this case the pulleys, 40, 41, are loosely mounted on the worm shaft which is formed as an extension of the shaft, 51. The pulleys are formed with clutch surfaces, 55, 56, adapted to be engaged by corresponding clutch members, 58, 59, of a duplex clutch member, 60, secured on the shaft, 51. The outer end of this shaft is provided with a collar, 61, situated within a box, 62, which is engaged and prevented from rotating by the fork, 63, of a lever, 65, pivoted on a pin, 64, carried by a bracket, 65ª. By oscillating the lever, 65, the shaft, 51, is reciprocated and consequently the clutch members, 58, 59, may be brought respectively into engagement with the clutch members, 55, 56, on the pulleys, 40, 41, the shaft, 51, being accordingly rotated to cause the worm, 39, thereon and the worm wheel, 38, to effect a rise or fall of the arm, c. In order to allow for a hand feed the shaft, 51, is adapted to be locked to the hand wheel, 52, for instance, the end of the shaft, 51, is fitted with a double ended clutch piece and driver, 66, which engages a split clutch ring, 67, a slotted groove in the latter receiving the driver end, 68, of the driver, 66, while the bifurcated end, 69, thereof projects into the space, 70, between the ends of the split ring, 67. These ends are beveled and the tongues of the bifurcated end, 69, are also beveled. The ends of the ring and the tongues have slight central flats so that when these coincide as shown in Fig. 12 the ring is expanded and pressing firmly against the boss of the wheel 52, locks the latter to the shaft, 51, so that the latter can be rotated and a hand feed effected. This position of the shaft, 51, corresponds to the central or neutral position of the clutch member, 60, when neither wheel, 40, 41, is clutched to the shaft, 51, and the power feed is out of gear. When the shaft, 51, is slid by the lever, 65, to either side of this central position to cause the arm, c, to be raised or lowered by power, then the beveled ends of the split ring, 67, are released and the latter springs inward onto washers, 71, thus releasing the hand wheel, 52. The latter is retained in the boss of the bracket, 65, by a set screw, 72, and a ring, 73.

It is preferred to employ for the work table one comprising an upper rotatable table mounted upon another table which can be moved on slides by a screw or other device, which slides are mounted upon a third table adapted to be moved in slides at right angles to those just mentioned, the latter being carried upon a column having a split or splayed base fitted with wheels adapted to run on rails or run-ways connected by cross girders with a rack into which a pinion may mesh, the pinion being carried upon a vertical shaft fitted with a hand wheel and suitably mounted upon the table base so that the table may be run or moved by hand.

Having now described our invention what we claim as new and desire to secure by Letters Patent is:—

1. In a woodworking machine having an overhanging arm, a capstan head in the end of the arm, a housing carried by and below said head, a cutter spindle carried by said housing, and gearing for rotating said spindle, said spindle and housing being adapted to be lowered until the axis of the cutter spindle is at or below the level of the work operated on, substantially as and for the purpose hereinbefore set forth.

2. In a woodworking machine having an overhanging arm, means for bodily raising and lowering said arm in a vertical plane, a capstan head on the end of the arm, a housing carried by and below said head, a cutter spindle mounted in said housing and means for rotating said spindle, substantially as and hereinbefore set forth.

3. In a wood working machine having an overhanging arm means for raising the arm by power, means for raising the arm by hand, a capstan head on the end of the arm, a cutter spindle mounted in said head, and means for rotating said spindle in either direction, substantially as hereinbefore set forth.

4. In a wood working machine having an overhanging arm, a standard for supporting said arm, a screw carried by the standard, a rotary nut engaging said screw and carried by the arm, means for rotating the nut by power and means for rotating the shaft by hand, a capstan head on the end of said arm, a cutter spindle mounted in said head and means for rotating said spindle, substantially as hereinbefore set forth.

5. In a wood working machine in combination, an overhanging arm, a standard for supporting the same, means for raising and lowering said arm, a capstan head on the end of said arm, a cutter spindle mounted in said head, worm gearing for driving said spindle a main shaft within the standard, and a reversing gear for connecting said shaft to the worm gearing for enabling the cutter spindle to be driven in either direction, substantially as hereinbefore set forth.

6. In a wood working machine in combination, an overhanging arm, a standard for supporting the same, means for raising and lowering the arm, a capstan head, on the end of the arm, a cutter spindle mounted in said head, worm gearing for driving said spindle, a shaft connected with said gearing and extending to the aforesaid standard, pulleys loosely mounted on said shaft, means for driving said pulleys in opposite directions and means for connecting either pulley to the shaft.

7. In a wood working machine in combination an overhanging arm, a standard for supporting the same, means for raising and lowering the arm, a capstan head on the end of the arm, a cutter spindle mounted in said head, worm gearing for driving said spindle, a shaft connected with said gearing and extending to the aforesaid standard, pulleys loosely mounted on said shaft, a belt passing over said pulleys, a counterbalanced tension pulley in one loop of said belt, and a driving pulley in the other loop, and clutches for securing either of the aforesaid loose pulleys to the shaft, substantially as and for, the purpose set forth.

8. In a wood working machine in combination, an overhanging arm, a standard for supporting the same, a screw carried by the standard and a nut engaging said screw and carried by the arm, a worm and worm wheel for rotating said nut, a main driving shaft, and means intermediate of said main shaft and the worm for enabling the former to drive the latter in one direction or the other as required to raise or lower the arm, substantially as described.

9. In a wood working machine comprising an overhanging arm, having a capstan head fitted with a cutter spindle and worm gear for driving the latter the combination of a screw carried by the standard, a nut carried by the arm and engaging said screw, a worm shaft and worm wheel for rotating said nut. a shaft connected with the aforesaid worm gearing two loose pulleys on said shaft, clutches for connecting either pulley to the shaft, means for driving said pulleys in opposite directions and means for effecting a driving connection between either of them and the aforesaid worm shaft, substantially as hereinbefore set forth.

10. In a wood working machine comprising an overhanging arm, having a capstan head fitted with a cutter spindle and worm gear for driving the latter the combination of a screw carried by the standard, a nut carried by the arm and engaging said screw, a worm shaft and worm wheel for rotating said nut, a shaft connected with the aforesaid worm gearing two loose pulleys on said shaft, clutches for connecting either pulley to the shaft, means for driving said pulleys in opposite directions, means for effecting a driving connection between either of them and the aforesaid worm shaft, and means for operating said worm shaft by hand, substantially as hereinbefore set forth.

11. In a wood working machine comprising an overhanging arm, having a capstan head fitted with a cutter spindle and worm gear for driving the latter the combination of a screw carried by the standard, a nut carried by the arm and engaging said screw, a worm shaft and worm wheel for rotating said nut, a shaft connected with the aforesaid worm gearing two loose pulleys on said shaft, clutches for connecting either pulley to the shaft, means for driving said pulleys in opposite direction a second pair of loose pulleys on the aforesaid worm shaft, belts connecting the latter pulleys to the aforesaid pulleys, clutches for connecting either of the pulleys on the worm shaft to the latter, and means for rotating the worm shaft by hand, substantially as and for the purposes hereinbefore set forth.

12. In a wood working machine comprising an overhanging arm a standard for supporting the same and a capstan head in the end of the arm having a cutter spindle, means for driving said spindle in either direction, and means for raising the arm by hand or power comprising a screw carried by the standard, a nut carried by the arm and engaging said screw, a worm shaft and worm wheel for rotating said nut, a pair of loose pulleys on said worm shaft, means for driving said pulleys in opposite directions clutches comprising clutch surfaces in the pulleys and clutch members in the worm shaft for coacting therewith, and means on the aforesaid arm adjacent to the capstan head for reciprocating said worm shaft to engage either clutch and also for rotating the worm shaft by hand.

13. In a wood working machine comprising an overhanging arm, a standard for supporting the same, and a capstan head in the end of the arm, having a cutter spindle means for driving said spindle in either direction, and means for raising the arm by hand or power comprising a screw carried by the standard, a nut carried by the arm and engaging said screw, a worm shaft and worm wheel for rotating said nut, a pair of loose pulleys on said worm shaft, means for driving said pulleys in opposite direction clutches comprising clutch surfaces in the pulleys and clutch members on the worm shaft for coacting therewith, and means on the aforesaid arm adjacent to the capstan head for reciprocating said worm shaft to engage either clutch and also for rotating the worm shaft by hand, said means comprising an oscillatory lever, a collar fixed on the worm shaft, a sliding collar engaging therewith and engaged by the oscillatory lever, a hand wheel and means for connecting said wheel with the worm shaft when the latter is moved into either extreme position, and for disconnecting said wheel from the worm shaft when the latter is in a midposition, substantially as hereinbefore set forth.

14. In a wood working machine, an overhanging arm a standard for supporting the same vertical guides on the standard for the one end of the arm, means for raising and lowering the arm in said guides, a capstan head at the free end of the arm, a cutter spindle carried by said head, in bearings depending below the head, means for rotating said spindle, and means for reciprocating it, substantially as hereinbefore set forth.

15. In a wood working machine, an overhanging arm, a vertical standard for supporting the same, means for raising and lowering said arm, a capstan head on the free end of the arm, a cutter spindle carried by said head and worm gearing for driving the same, a driving shaft extending through said arm to the standard, a reversing gear within the standard comprising loose pulleys on the driving shaft means for driving said pulleys in either direction and clutches for securing either pulley to the driving shaft, a rod passing through the aforesaid shaft for operating the clutches and means at the capstan head for reciprocating said rod, substantially as hereinbefore set forth.

16. In a wood working machine, an overhanging arm, a standard for supporting said arm, means for raising and lowering said arm, a capstan head on the outer end of the arm, a cutter spindle carried by said head, worm gearing for rotating said spindle, and means for reciprocating said spindle, comprising a rack connected with the spindle, a pinion gearing with the rack and mounted on the end of a boss and a hand lever mounted on said boss.

17. In a wood working machine, an overhanging arm, a standard for supporting said arm, means for raising and lowering said arm, a capstan head on the outer end of the arm, a cutter spindle carried by said head, worm gearing for rotating said spindle a rack, a threaded spindle carrying said rack, a tubular rod carrying the latter a cross head connecting the tubular rod to the cutter spindle, a pinion meshing with the aforesaid rack and means for rotating said pinion, substantially as and for the purpose hereinbefore set forth.

18. In a wood working machine, an overhanging arm a standard for supporting said arm, means for raising and lowering said arm, a capstan head on the outer end of the arm, a cutter spindle carried by said head, worm gearing for rotating said spindle, and means for reciprocating said spindle comprising a rack connected with the spindle, a pinion gearing with the rack and mounted on the end of a boss and a hand lever mounted on said boss and means for locking the hand lever in various positions comprising a spring pressed plunger adapted to engage in any of a series of holes in a dial plate on the capstan head.

19. In a wood working machine, having an overhanging arm, a standard for supporting the same, means for raising and lowering said arm, a capstan head in the outer end of the arm, a cutter spindle mounted in said head, worm gearing for driving said spindle, rack and pinion gearing for reciprocating the same, and a hand lever for rotating said pinion, means for limiting the movements of the hand lever and for locking it in the extreme position, comprising a spring pressed catch carried by the lever, and adjustable catch plates carried by a dial plate on the capstan head and adapted to be engaged by said catch, substantially as hereinbefore set forth.

20. A wood working machine, comprising an overhanging arm, a standard for supporting the same, hand and power operated means for raising and lowering the arm, a capstan head carried by the end of the said arm, a cutter spindle mounted on said head, means for rotating the spindle in either direction, means for reciprocating the spindle, and means adjacent to the capstan head for controlling the means for raising and lowering the arm, and the means for rotating the cutter spindle.

21. A wood working machine comprising an overhanging arm, a standard for supporting the same, means for raising and lowering the arm, a capstan head on the free end of the arm, a cutter spindle carried on said head, means for rotating said spindle in either direction, a pair of pulleys carried by the arm for driving the cutter spindle driving means and the arm raising and lowering means and means for constantly driving said pulleys in opposite directions irrespective of the height of the arm, consisting of a main driving pulley, a belt passed over the aforesaid pulleys, and having one loop around the main driving pulley, a tension pulley in the other loop of the belt and a counterweight for said tension pulley, substantially as hereinbefore set forth.

In testimony whereof we have signed our names to this specification in the presence of subscribing witnesses.

JOSEPH WILLIAM WADKIN.
THOMAS SCOTT-KING.

Witnesses as to Joseph William Wadkin:
ERNOLD SIMPSON MOSELEY,
MALCOLM SMETHURST.
Witnesses as to Thomas Scott-King:
ALBERT S. PHILLIPS,
HILDA COX.